(12) United States Patent
Suponnikov et al.

(10) Patent No.: US 10,107,922 B2
(45) Date of Patent: Oct. 23, 2018

(54) SCINTILLATION DETECTOR AND METHOD FOR FORMING A STRUCTURED SCINTILLATOR

(71) Applicant: "STC-MT" LLC, Moscow (RU)

(72) Inventors: Dmitry Aleksandrovich Suponnikov, Moscow (RU); Andrei Nikolaevich Putilin, Moscow (RU); Anatoliy Rudolfovich Dabagov, Moscow (RU)

(73) Assignee: "STC-MT" LLC, Moscow (RU)

( * ) Notice: Subject to any disclaimer, the term of this patent is extended or adjusted under 35 U.S.C. 154(b) by 319 days.

(21) Appl. No.: 14/787,625

(22) PCT Filed: Apr. 28, 2014

(86) PCT No.: PCT/RU2014/000308
§ 371 (c)(1),
(2) Date: Feb. 10, 2016

(87) PCT Pub. No.: WO2014/178758
PCT Pub. Date: Nov. 6, 2014

(65) Prior Publication Data
US 2016/0154120 A1    Jun. 2, 2016

(30) Foreign Application Priority Data
Apr. 29, 2013 (RU) ................................ 2013119795

(51) Int. Cl.
*G01T 1/20* (2006.01)

(52) U.S. Cl.
CPC .......... *G01T 1/2012* (2013.01); *G01T 1/2018* (2013.01)

(58) Field of Classification Search
CPC .............................. G01T 1/2012; G01T 1/2018
(Continued)

(56) References Cited

U.S. PATENT DOCUMENTS

3,752,981 A * 8/1973 Jaszczak ............... G01T 1/1642
250/363.07
3,859,531 A * 1/1975 Van Dijk .............. G01T 1/1642
250/363.02
(Continued)

*Primary Examiner* — David Porta
*Assistant Examiner* — Blake Riddick
(74) *Attorney, Agent, or Firm* — Boyle Fredrickson S.C.

(57) ABSTRACT

The proposed group of inventions relates to methods for depositing fluorescent coatings on screens, by which an image is detected and/or converted, in particular, to methods of forming a structured scintillator on the surface of a photodetector intended for the detection of X-ray or gamma radiation, hereinafter referred to as the detected radiation, and to devices for obtaining an X-ray image, or an image obtained by detection of gamma radiation, particularly to devices for X-ray mammography and tomosynthesis. A method for forming a structured scintillator on the surface of a pixelated photodetector, wherein according to embodiment 1, at least one structural element is formed directly on the surface of the photodetector, the material of which is deposited by using a two-axis or a three-axis means for discrete deposition of liquid or heterogeneous substances. According to embodiment 2 of the method of forming a structured scintillator on the surface of a pixelated photodetector, at least one structural element is formed directly on the surface of the photodetector previously segmented with a hydrophobic insulating coating consistent with interpixel insensitive areas so that geometric shapes of depositing the material of the structural element are formed under the action of surface tension forces of the boundary of hydrophobic-hydrophilic areas of the photodetector surface. In addition, the group of inventions includes two embodiments of scintillation detectors. The inventions of the proposed group improve the manufacturability with simultaneous extension of the scope of application.

27 Claims, 7 Drawing Sheets

(58) Field of Classification Search
USPC .................... 250/361 R, 370.11, 367, 370.09
See application file for complete search history.

(56) References Cited

U.S. PATENT DOCUMENTS

| | | | | |
|---|---|---|---|---|
| 4,542,297 | A * | 9/1985 | Hold .................... | G01B 15/025 250/358.1 |
| 6,557,967 | B1 * | 5/2003 | Lee ........................ | B41J 2/1433 216/27 |
| 7,265,357 | B2 * | 9/2007 | Pham Gia .......... | C09K 11/7701 250/367 |
| 2002/0079455 | A1 * | 6/2002 | Wieczorek ............ | G01T 1/2018 250/367 |
| 2004/0113088 | A1 * | 6/2004 | Brabec ................. | G01T 1/2018 250/370.11 |
| 2006/0033030 | A1 * | 2/2006 | Ito ......................... | G01T 1/2018 250/370.11 |
| 2006/0169908 | A1 * | 8/2006 | Mori .................... | G01T 1/2018 250/370.11 |
| 2007/0114424 | A1 * | 5/2007 | Danielsson .......... | A61B 6/4241 250/370.09 |
| 2008/0128631 | A1 * | 6/2008 | Suhami ................... | G01T 5/02 250/370.09 |
| 2008/0272416 | A1 * | 11/2008 | Yun .................... | H01L 27/14627 257/292 |
| 2009/0129538 | A1 * | 5/2009 | Tkaczyk ................ | A61B 6/032 378/5 |
| 2009/0314947 | A1 * | 12/2009 | Goushcha ............. | G01T 1/2018 250/363.01 |
| 2010/0164034 | A1 * | 7/2010 | Park .................. | H01L 27/14621 257/432 |
| 2011/0079726 | A1 * | 4/2011 | Kusner ................ | G01T 1/2008 250/369 |
| 2012/0121067 | A1 * | 5/2012 | Hayden .................. | G01T 1/023 378/62 |
| 2012/0153163 | A1 * | 6/2012 | Levene ................ | G01T 1/2018 250/361 R |
| 2012/0225767 | A1 * | 9/2012 | Imholt .................. | B29D 11/00 501/1 |
| 2013/0009047 | A1 * | 1/2013 | Grazioso ................ | G01T 1/202 250/252.1 |
| 2013/0009066 | A1 * | 1/2013 | Grazioso ............... | G01T 1/1642 250/363.03 |
| 2013/0058452 | A1 * | 3/2013 | Levene ................ | G01T 1/2018 378/19 |
| 2013/0140464 | A1 * | 6/2013 | Iwakiri ................ | A61B 6/4283 250/366 |
| 2014/0328964 | A1 * | 11/2014 | Mark .................. | B29C 67/0088 425/166 |
| 2015/0378033 | A1 * | 12/2015 | Suponnikov .......... | G01T 1/2002 250/368 |

\* cited by examiner

| $\alpha_{wt}$ hphil. | Hydrophilic wetting angle |
| $\alpha_{wt}$ hphob. | Hydrophobic wetting angle |

SCINTILLATION DETECTOR AND METHOD FOR FORMING A STRUCTURED SCINTILLATOR

BACKGROUND OF THE INVENTION

Field of the Invention

The proposed group of inventions relates to methods for depositing luminescent coatings on the screens, using which an image is detected and/or converted, in particular, to methods of forming a structured scintillator on the surface of a photodetector intended for detection of X-ray or gamma radiation, hereinafter referred to as the detected radiation, as well as to devices for obtaining an X-ray image or an image obtained by detection of gamma radiation, particularly to devices for X-ray mammography and tomosynthesis.

Description of Related Art

So-called "flat" visible image detectors, including those for mammography, which performs the conversion of X-ray image ("shadow") of the test subject to the electrical signals, are used to construct digital X-ray detectors. These flat detectors are full-dimensional (array) image sensors with a spatial conversion scale of 1:1.

The photodetector itself has a high sensitivity in the range of wavelengths of visible light (between about 400 and 700 nm), but usually it is X-ray insensitive. Accordingly, the X-ray phosphor coatings or so-called scintillation screens (scintillators) having different conversion efficiencies and scattering characteristics are used to convert an X-ray image into a visible image. This screen is physically placed (docked) onto the photodetector, thus forming an "image-to-electrical signal" transformation stack. The signal, in turn, is converted to digital form and transmitted to the processing and rendering.

The essential problem of the "screen-photodetector" stack is an optical scattering provokes the partial exposure of image areas (pixels) by the light from adjacent areas. The level of such stray light is defined by factors such as:

- directional characteristics of the screen luminosity (aperture);
- distance between the surfaces of the screen and photo detector in the stack.

Also, an additional reduction in the contrast is caused by internal re-reflections in the scintillator (screen).

An accurate alignment of the array photodetector structure with a scintillator structure divided into pixel areas of the screen is one of the main technically complicated and technologically time-consuming tasks. The equipment needed for the purpose of such an alignment and the value of its depreciation significantly increase the cost of the product built on structured phosphor.

In addition, the formation of special partitions in the scintillator is an expensive and extremely high-tech process that requires the use of expensive equipment and skilled personnel.

The prior art contains, a detector that has a structured scintillator and a method for depositing the said scintillator on the surface of the photodetector using the silk-screen printing method are known (JP2002-139568, CANON KK, G01T1/20, publ. 17.05.02, prototype). The disadvantage of this method is that it requires prior manufacture of a grid consistent with the size of the pixels of the photodetector and therefore a precise alignment procedure during the process of phosphor deposition. This invention actually limits the minimal size of a pixel to be deposited to the photodetector to 150-200 microns corresponding to the limitation of resolution of the silk-screen process. In general, the printing methods described in the said patent, are so-called integral ones, i.e. aimed to obtain a structural array of the scintillator in a single cycle without the possibility of formation of each (or a single) element of the structure separately.

SUMMARY OF THE INVENTION

The development of a new method of forming a structured scintillator on the surface of a pixelated photodetector and a scintillation detector made using the said method, as well as the improvement in manufacturability with simultaneous extension is the overall objective of the group of inventions and the required technical result to be achieved by using the group of inventions.

The defined tasks and the required technical results are achieved by using the said group of inventions, that the method (embodiment 1) of the formation of the structured scintillator on the surface of the pixelated photodetector, in which, according to the invention, at least one structural element is formed directly on the surface of the photodetector the material of which is deposited by use of a two-axis or a three-axis means intended for discrete deposition of liquid or heterogeneous substances. In this case, a means is used comprising at least one printing head consistent with the structure of the photodetector pixels, that has a photosensitive area.

According to one aspect, invention has been characterized by the heterogeneous properties of the structural elements in the longitudinal direction due to the deposition process features.

According to another aspect, the invention has been characterized as follows the material of each of the structural elements is deposited at least in a single pass of the printing head or a discrete printing device (i.e. the deposition process allows to form a minimal part of the image separately and not the entire image in one time).

According to third aspect, the invention has been characterized by the amount of material to be deposited controlling, so the scintillation structural elements are preferably formed on the sensitive area of the pixel, wherein the said material includes at least one phosphor composition.

According to another aspect, the invention includes the possibilities of deposition the hemispherical, parabolic, cylindrical shape, the shape of a truncated pyramid and, in general, the piecewise-continuous surface of the second or higher order or a combined shape of elements.

According to another aspect, the invention is wherein a printing head is used with a nozzle whose shape is matched with the structure of photodetector pixels.

According to another aspect, the invention includes the possibilities of deposition of structural elements between pixel sensitive areas that are further formed of at least one material that absorbs the detected radiation.

According to another aspect, the invention is wherein the material that absorbs the detected radiation is deposited after forming the scintillation structural elements or the material of the scintillation structural elements is deposited after forming the structural elements of the material that absorbs the detected radiation, or the material of scintillation structural elements and the material that absorbs the detected radiation are alternately deposited.

According to another aspect, the invention is wherein each structural element or at least part thereof is formed separately from the others.

According to another aspect, the invention is wherein the surface of the scintillator, preferably the surface of the structural scintillation elements, is coated with at least one layer of reflective coating.

According to another aspect, the invention is wherein the structural elements are formed having locally differing optical and physical parameters across the entire photodetector plane to compensate for non-linearity and non-uniformity of the sensitivity of the photodetector output signal.

When using the group of inventions, the defined tasks and the required technical results are also achieved as follows, the scintillation detector (embodiment 1) comprises at least one photodetector with an array of pixels, each of which has a photosensitive area, and a scintillator comprising at least one structural element made using the proposed method of the embodiment 1.

When using the group of inventions, the defined tasks and the required technical results are also achieved due to the application of method (embodiment 2) for forming a structured scintillator on the surface of a pixelated photodetector, wherein, according to the invention, at least one structural element is formed directly on the photodetector surface that was previously segmented with a hydrophobic insulating coating corresponding to interpixel insensitive areas so that geometric shapes of the deposition of the material of the structural element are formed under the influence of surface tension on the boundary of the hydrophobic-hydrophilic areas of the photodetector surface.

According to another aspect, the invention is wherein the hydrophilic material is further deposited to sensitive areas of pixels.

According to another aspect, the invention is wherein the material of the structural element is deposited by immersing the photodetector in the said material or by flooding the photodetector surface with the said material, which provide consistent deposition (sedimentation) of the phosphor material on the surface of the photodetector, or by using a two-axis or a three-axis means for discrete deposition of liquid or heterogeneous substances, wherein at least one phosphor composition is used as the material of the photodetector element.

According to another aspect, the invention is wherein structural elements are further formed of at least one material that absorbs the detected radiation, preferably between pixel sensitive areas, wherein a two-axis or a three-axis means for discrete deposition of uniform liquid or heterogeneous substances is used for their formation, comprising at least one printing head matched with the structure of the photodetector pixels, each of which has a photosensitive area.

According to another aspect, the invention is wherein each structural element is formed, or at least a part thereof is formed, separately from others.

According to another aspect, the invention is wherein the surface of the scintillator, preferably the surface of coated scintillation structural elements, is coated with at least one layer of reflective coating.

According to another aspect, the invention is wherein structural elements are formed having locally differing optical and physical parameters across the entire photodetector plane to compensate for non-linearity and non-uniformity of the sensitivity of the photodetector output signal.

When using the group of inventions, the defined tasks and the required technical results are also achieved by that the scintillation detector (embodiment 2) comprises at least one photodetector with an array of pixels, each of which has a photosensitive area and a scintillator comprising at least one structural element made by the said method according to embodiment 2.

A distinctive feature of the proposed group of inventions is a new method of forming a structured scintillator on the surface of a pixelated photodetector, wherein, in particular, a two-axis or a three-axis means is used for the discrete deposition of homogeneous liquid or heterogeneous substances for depositing directly to the photodetector surface the material of at least one structural element of the scintillator, which improves the manufacturability of the proposed method that allows forming many various designs of the scintillator, the structural elements of various shapes with a various heterogeneous structure, as well as depositing and aligning scintillation structures on non-recurrent or different-dimensional photodetector arrays, thus simultaneously extending the scope of its application. The main advantage of the proposed method is the possibility of permanent elimination of the need for precise alignment of pixelated scintillating structures with the array of photodetectors. The structures of the scintillator and photodetector array are aligned immediately during the formation of the scintillation screen, which allows improving the manufacturability of forming a structured scintillator on the surface of a pixelated photodetector. The scintillator made using the proposed method is made as a structured set of elements isolated from each other and formed on the surface of the photosensitive area of the photodetector pixel. Local and isolated placement of each scintillation element relative to other scintillation elements ensures their optical separation at the scintillator level, even on pixels of small size, which in turn prevents ingress of light quanta from one sensitive area of the photodetector pixel to adjacent one, i.e. allows eliminating the effect of scattering between adjacent pixels.

DETAILED DESCRIPTION OF THE PREFERRED EMBODIMENTS

The proposed method according to embodiments 1 and 2 includes processes of the deposition (printing) in a discrete manner, which allows forming each element of the scintillator structure (or only a single one or a group) separately.

Such a method can be defined as a discrete (or digital) as one that does not require pre-fabrication of patterns or masks. One of the main advantages of the proposed method according to embodiments 1 and 2, which improves its manufacturability, is the possibility of permanent elimination of the necessity of accurate alignment of pixilated scintillating structures with the array of photodetectors. The scintillator structure and photodetector array are aligned immediately during the formation of the scintillation screen.

Figure 1:
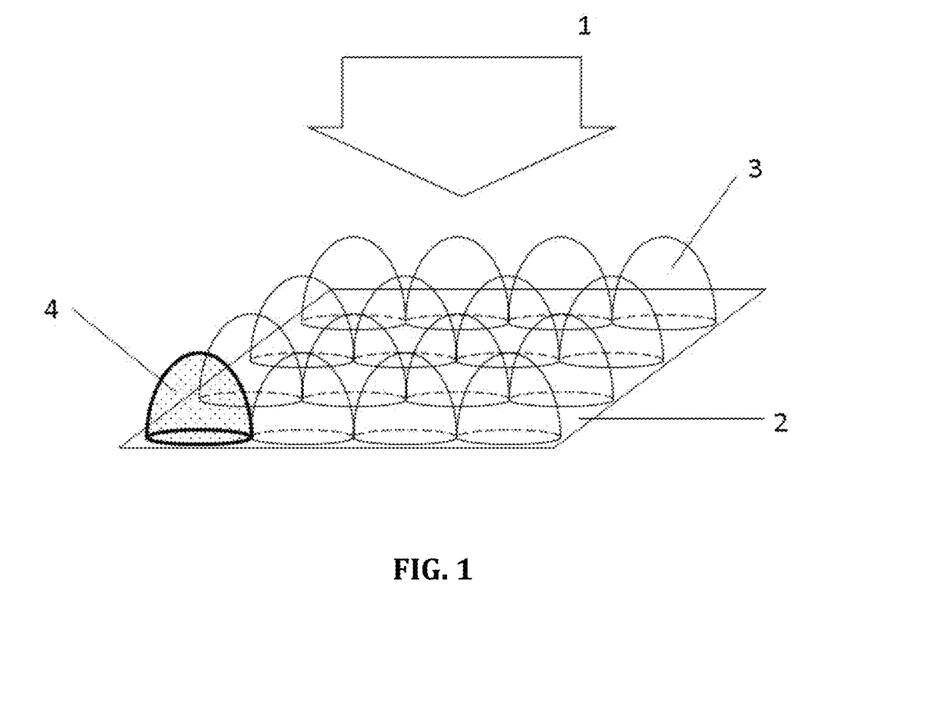
FIG. 1 shows a general view of the structure of the scintillator and its orientation relatively to the photodetector and the source of the detected radiation.

FIG. 1 shows a general view of the structure of the scintillator made using the proposed method of embodiment 1 and its orientation with respect to the detected radiation source 1 and the pixelated photodetector 2.

Figure 2:
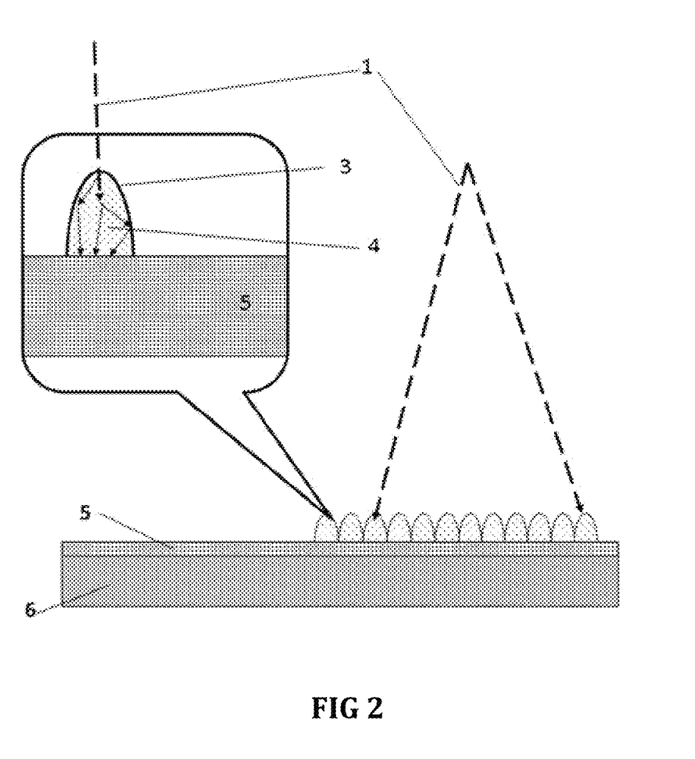
FIG. 2 shows a fragment of the scintillator element and the optical path of ray reflections inside it.

The scintillator according to embodiment 1 comprises a plurality of scintillation structural elements 3 produced from the material that is a phosphor composition 4. Such a detector has a higher contrast of the detected image due to the absence of the effect of scattering between adjacent pixels of the array photodetector 2 due to the physical isolation of adjacent pixels (not shown in the drawings) of the photosensitive area 5 (FIG. 2) at the level of scintillation coating, namely the phosphor 4. Indeed, the light produced by the phosphor 4 will only reach the area of "its own" pixel and will not reach the adjacent one. The photosensitive area 5 of the array photodetector is located on the substrate 6 (basis). The scintillator according to embodiment 1 may contain additional partitions 7 (FIG. 3) made of material that absorbs the detected radiation and reflects the visible light. The presence of the partitions 7 will further contribute to the reflection of the light produced by the phosphor 4, (FIG. 2) it will only reach the area of "its own" pixel (not shown in the drawings) and will not reach the adjacent one, thus further contributing to increasing the contrast of the image. For example, when detecting X-ray or gamma radiation, the partitions 7 will contribute to the additional absorption of the corresponding radiation in the interpixel intervals, thus reducing its scattering at the level of the scintillator as a whole.

Figure 3:
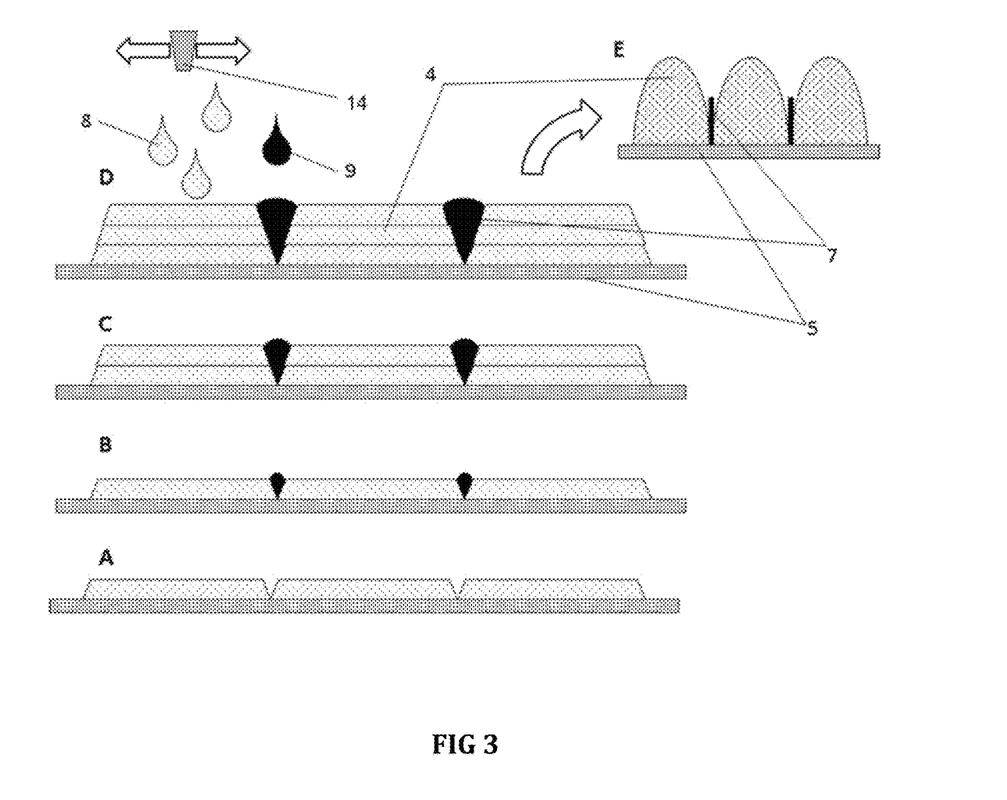
FIG. 3 shows a process of forming the structure of the scintillator (bottom-up), where A is the formation of the first phosphor layer; B is the beginning of deposition of the partition material; C is deposition of the second layer of phosphor and partition materials; D is deposition of the third layer of phosphor and partitions; E is the final form of a structured scintillation coating (cross-section).

To form such a scintillator stack structure according to embodiment 1, an industrial printer of high resolution is used, capable of printing microstructures with special ink, for example, ink 8 based on phosphor composition and/or ink 9 based on material absorbing the detected radiation (FIG. 3). These inks are usually made of a polymeric binder and nanoscale materials constituting the active base of a converter of the detected radiation into the visible light, and are a suspension or colloidal solution of a phosphor in a binder.

The process of making the stack according to embodiment 1 consists of several cycles. In the first cycle, specially shaped scintillator structures are formed, for example, having truncated pyramid 10, parabolic 11 (FIG. 4A), conical 12, hemisphere 13 shapes or a combined shape (not shown in the drawings). To fulfill this task, one or more passes of the printing head 14 (FIG. 3) over the photosensitive area 5 of the array photodetector 2 are used.

In the second cycle, the partitions 7 between the pixels (not shown in the drawings) are formed by ink 9 based on material absorbing the detected radiation and reflecting the visible radiation. Such partitions 7 are also deposited by means of air spray, dispersion or ink jet printing or similar known discrete methods. Additional absorption of the detected radiation in interpixel intervals reduces its scattering in the plane of the scintillation screen as a whole.

Depending on the characteristics of the ink, in particular, its viscosity and process requirements, the first and second cycles, i.e. the steps of depositing scintillation structural elements and partitions, respectively, may be swapped or performed alternately with the lamination of appropriate materials. For example, if the viscosity of the phosphor ink 8 is higher than the viscosity of the ink 9 of partition material, the phosphor-based ink 8 is fully deposited first, and then the partition ink 9 is deposited (not shown in the drawings). In another case, if the viscosity of the ink 9 is higher than the viscosity of the ink 8, on the contrary, the partition ink 9 is fully deposited first, and then ink 8 of the scintillation elements is deposited (not shown in the drawings). If viscosities of both ink 8 and 9 are equal, their deposition will alternate (FIG. 3A-E).

In an additional (optional) cycle, a reflective coating is deposited, which in turn may be metal and/or single-layer or multi-layer dielectric one (not shown in the drawings). This coating allows increasing the efficiency of the scintillator by reducing radiation losses of each scintillating particle as a Lambertian source.

Figure 5:
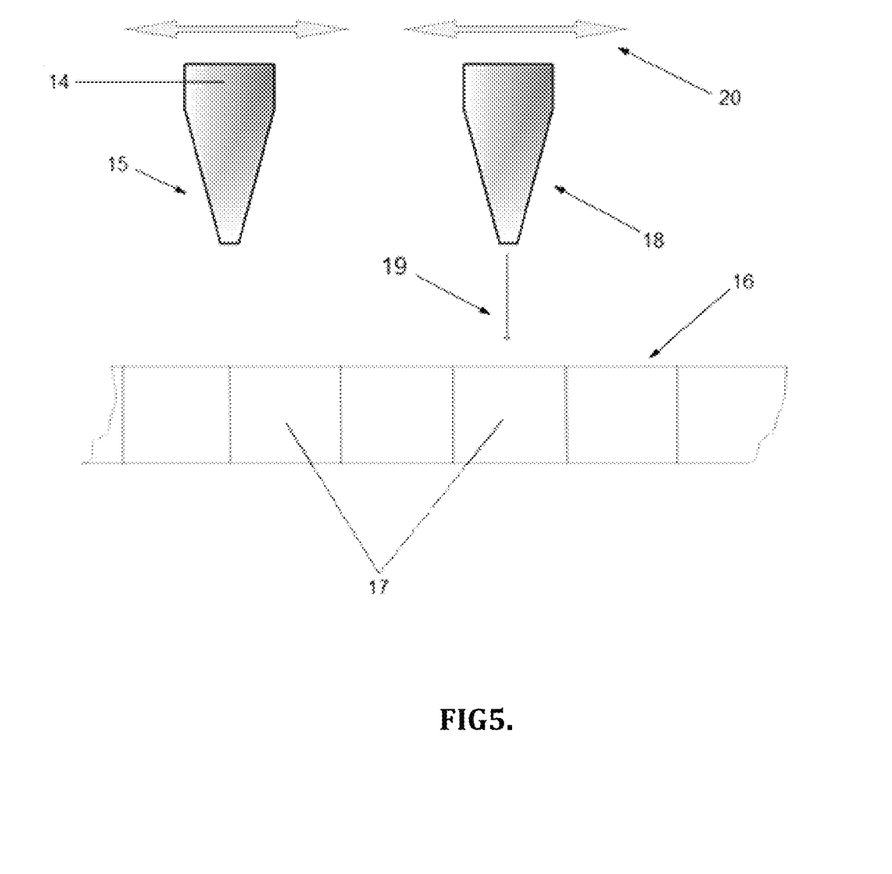
FIG. 5 shows the movement of the printing head over the surface of the photodetector during the deposition of the scintillation material.

Another possibility to make the said scintillation photodetector according to embodiment 1 is a modification of the discrete deposition of phosphor using a dedicated printer fitted with a profiled printing head 14 (FIG. 5) having a nozzle die, the shape of which is matched with the pixel structure 16 of the photodetector for the single-pass formation of a structural element 3 or 7. In this case, the head 14 may have the position 15 between pixels 17 of the sensitive area 5 of the photodetector and the position 18 over the pixel 17 of the photodetector sensitive area 5 (FIG. 5). The position 19, FIG. 5, indicates the direction of deposition of the phosphor material 8. The direction of the head movement may be two-axis 20 or three-axis (not shown in the drawings). The two-axis movement and, respectively, the means are used for depositing the scintillator on the flat surface of the photodetector. The three-axis means is used, respectively, for the relief surfaces. This is due to the fact that when depositing the scintillation structure, the distance between the nozzle printing head and the substrate surface should preferably be fixed. Accordingly, the three-axis means can maintain this distance while adjusting the position of the head height according to the surface topography.

In particular, according to embodiment 1 the mean for a discrete liquid printing with a three-axis motion of the printing head may be used for preparation of the structural elements by with more accurate control of the contact time of a drop of deposited suspension with the photodetector array plane. The physicochemical properties of the drop substance may change a lot because of the peculiarities of drop formation process and flight of the said drop to the deposition plane. In particular, evaporation of the binder as a part of the phosphor composition results in a changing of the viscosity of the composition. Therefore, the drop spreading area will change too. The flexibility of the deposition process according to embodiment 1 increases greatly due to the controlling of the print head position along the third axis and expands the range of the devices applications.

Figure 4:
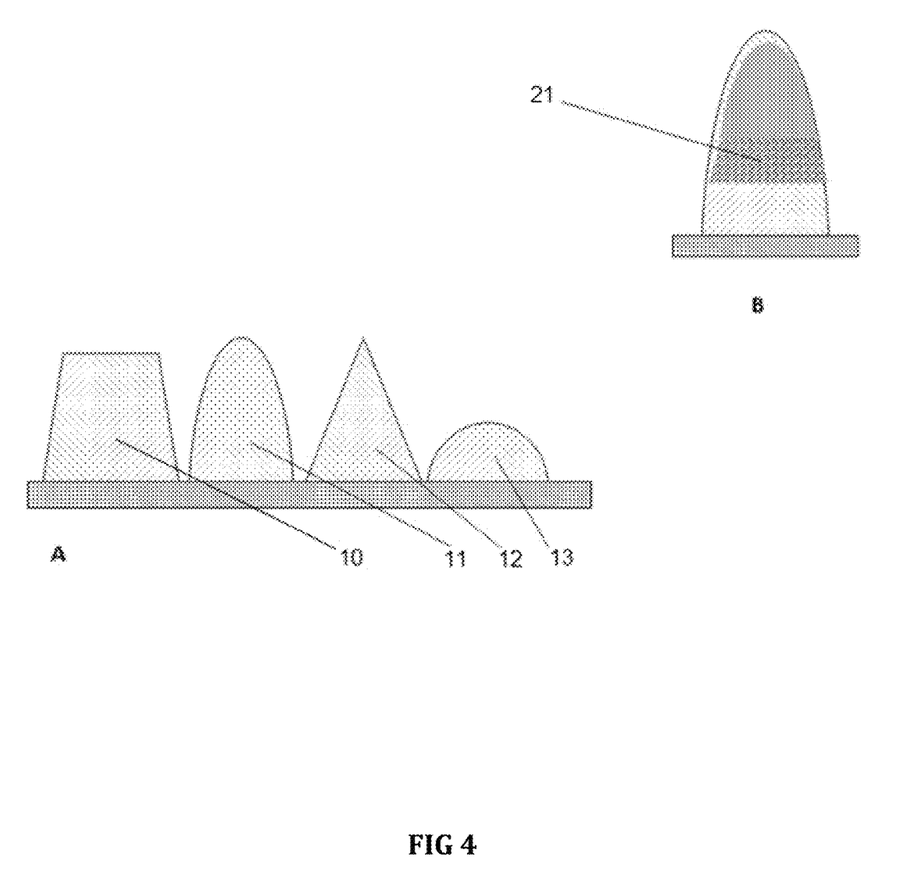
FIG. 4 shows various embodiments of shape (A) and composition (B) of the scintillator elements.

Moreover, due to the adjustment of the ink material dosing, the ink type and viscosity, as well as velocity of exhaust from the nozzle die, the desired phosphor profile configuration 21 (FIG. 4B) containing different phosphor compositions is obtained. FIG. 4B shows the case of three different phosphor compositions deposition.

Figure 6:
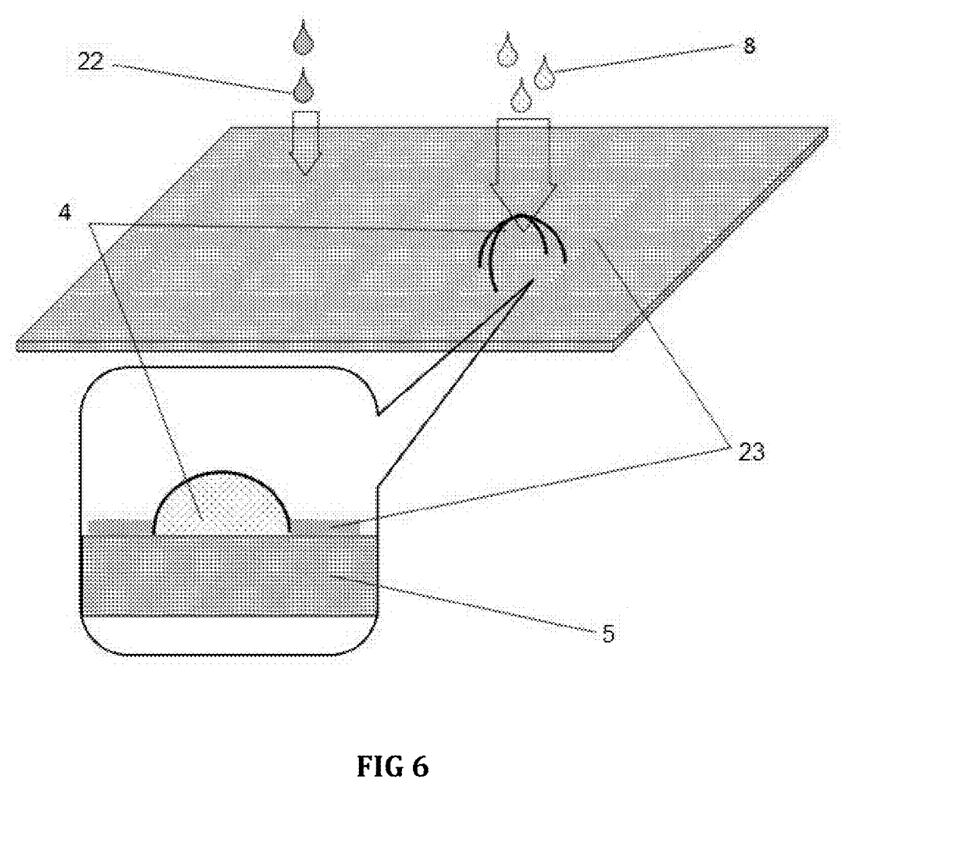
FIG. 6 shows a method of forming the structure of the phosphor by separation of the array photodetector surface into hydrophobic and hydrophilic areas.

The second embodiment of the formation of the pixelated structure of the phosphor coating deals with the two or more stage process, during which the hydrophobic coating material 22 is deposited between the areas of individual photosensitive pixels using the discrete printing method (described above), in order to divide the photosensitive area of the array photodetector 5 with hydrophobic protective strips 23 into pixel areas (FIG. 6). In this case, an active (photosensitive) areas of the pixels may be coated with a hydrophilic material (not shown in the drawings). Thereafter, the photodetector is brought into contact with the phosphor material 8 (phosphor suspension solution), for example, by means of immersing or pouring. A component of this solution (phosphor 4) is deposited only on the areas that have not been coated with the hydrophobic substance. Finally, the pixelated structure is immediately formed on the entire surface due to various effects of surface tension (such as the formation of water droplets on oil surface), which improves the manufacturability with simultaneous extension of the scope of application.

Another important feature of the method for manufacturing of detectors of penetrating radiation according to embodiment 2 is, the ability to modify the properties of the scintillator across the depth of phosphor structure 21, for example, layers with one spectrum (efficiency) of luminescence can be deposited in the surface (in the direction of penetration of X-rays or gamma rays) layers of structured phosphor, and the layers with another spectrum (efficiency) of luminescence can be deposited in the deep layers (FIG. 5B). Special X-ray absorbent layers can be deposited directly on the photodetector array followed by deposition of luminescent layers.

According to embodiment 2, the variations in the form of individual structural elements of the phosphor is possible during deposition in order to optimize the luminous efficiency and minimize consumption of scintillator material in the process of deposition (FIG. 5A).

According to methods proposed according to embodiments 1 and 2, the produced "scintillator-photodetector" stack is packaged. The proposed scintillation detector can be connected with the electronic control and processing circuits and can be placed in any package (not shown in the drawings). The scintillation detector can further comprise at least one power supply unit and/or at least one cooling unit and/or at least one unit for control and digital data transmission and/or, at least one analog data transmission unit, or any conceivable combination thereof for performing the processing and control of electronic circuits.

As a rule, the precise alignment of the pixels 17 of the photodetector 2 with the scintillator structure is one of the most difficult technical challenges. The equipment needed for such an alignment and its depreciation cost significantly increases the cost of the product based on structured scintillators. One of the main advantages of the new design according to the proposed method of scintillator formation and the scintillation detector obtained using the proposed method is the ability to eliminate permanently the need for precise alignment of a set of the structural elements 3 and 7 with the array of pixels 17 of the photodetector 2. The set of the structural elements 3, 7 and the array of the pixels 17 of the photodetector 1 are aligned immediately during the deposition of the structural elements 3, 7.

The proposed method of forming the scintillator and the produced scintillator detector according to embodiments 1 and 2 may find application in mammography (intended for the radiological examination of mammary glands) and x-ray systems, as well as in systems of X-ray and gamma-ray inspection, in high-energy particle detection systems in installations intended for research. The application of proposed group of inventions allows improving the contrast of the registered image and, therefore, providing better diagnostic quality of the image. The preferred area of application of the group of inventions is mammography. The related fields of application are radiography and fluoroscopy.

The following examples illustrate the manufacturing of various scintillation structures on the photosensitive surface of a photodetector in accordance with the method proposed in the claim according to embodiments 1 and 2.

Example 1: Deposition of a Spherical and Pyramidal Shapes Structural Elements with Indication of their Characteristics According to Embodiment 1

To test the possibility of formation of structures having a regulated (controlled) shape we can examine an example of printing on silicon with the Si3N4 passivation. Printing is carried out on the AerosolJet 300 (OptomecInc., USA) printer or another system oriented t the printed electronics technologies application. The material (phosphor) to be deposited on silicon is a rare-earth oxide composite (Gd2O3, Y2O3, Tb4O7). The said composite is prepared to form a suspension with a binder similar to polyvinyl alcohol (PVA). The colloidal solution having a viscosity of 200-300 cP and percentage of phosphor material in the suspension in the range of 40-60% a. Further, each element of the structure (e.g. hemispherical one) is formed with a variable time and phase of switching-on of the printing head during it movement over the area of structure forming. In general, these values, when programming the printer, will be as follows:

$$\varphi = \varphi_0 + \left(R - \frac{R}{\tan\left(\arcsin\left(\frac{n}{N}\right)\right)}\right)$$

$$t = 2\left(\frac{R}{\tan\left(\arcsin\left(\frac{n}{N}\right)\right)}\right) \cdot V$$

wherein $\varphi$ is a phase of opening the printing head nozzle, $\varphi_0$ is an initial position of printing a single structure, coinciding with the pixel edge region, N is a number of passes during which the structure is printed, n is a pass number, R is a radius of the hemisphere to be formed; t is time of printing, V is the printing head movement speed. Preferably, each pass is further preceded by a short (a few seconds or longer) period of infrared drying of the deposited layer, which is needed for the polymerization of the binder.

Example 2: Forming of a Heterogeneous Structure of a Spherical and Pyramidal Shapes According to Embodiment 1

This example describes the heterogeneous deposition of the phosphor structural elements on the surface of the photodetector for providing the better consistency of the parameters of the active layers. The structural elements are formed using the same layer-by-layer method as described in Example 1. In this case, the heterogeneity is achieved by changing the chemical composition or the quantity of binder in the composition. Thus, from one layer to another, the physicochemical properties of the structural elements will change gradually, for example, when depositing the first layers, such substances can be added to the composition that ensure the best adhesion of the composite to the surface of silicon with a passivation layer of Si3N4. In another embodiment, the deep layers of the composite may contain a phosphor with a maximum absorption of X-rays to ensure the protection of the photodetector silicon integrated circuit itself from stray X-ray irradiation.

Figure 7:
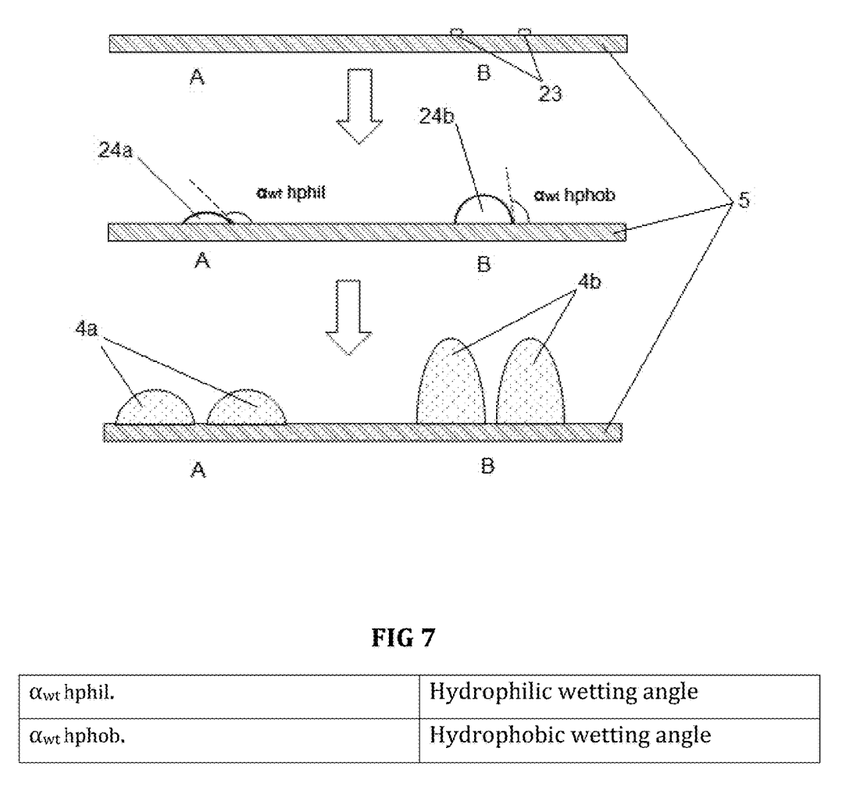
FIG. 7 shows a diagram of the formation of the scintillator on a substrate marked with a hydrophobic grid.

Example 3: Example of the Scintillator Formation According to Embodiment 2 on the Substrate Marked with a Hydrophobic Grid The hydrophobic coating is deposited by the method of discrete digital printing using the printer described in Example 1. In this case, no particular change is required as compared with conventional printing heads of commercial liquid printers, since the hydrophobic coating material itself is a true solution, which can contain nanoscale particles. After depositing a structure of dividing strips 23 (FIG. 7), it is possible to proceed to the deposition of the phosphor itself, in this case under the influence of surface tension, the contact angle of a drop of phosphor liquid composition is significantly reduced. FIG. 7 shows a phosphor drop 24a, when depositing without the hydrophobic coating, from which the corresponding structural element 4a (FIG. A) is formed, and shows the drop 24b, with the borders along the hydrophobic coating 23, from which the corresponding structural element 4b (FIG. B) is formed. As a result, the amount of phosphor material that can be retained within the area of a pixel of the array photodetector increases significantly. This allows, on the one hand, increasing the thickness of the phosphor layer, and on the other hand, obtaining a sharper separation of the pixels in a structured phosphor layer (FIG. 7, B). In the best embodiment of this process, the phosphor is deposited in a single pass of the printing head.

The deposition of the hydrophilic coating in the areas where there should be a luminescent structural element improves the adhesion and eventually the service life of the proposed detector; on the other hand, depositing a hydrophobic coating at the areas of boundaries of photosensitive area 5 pixels (FIG. 7B) of the silicon photodetector array enables better separation of the structured phosphor areas.

Thus, the structure of the scintillator and the photodetector array is aligned immediately during the formation of the scintillation screen, which improves its manufacturability. The proposed method according to embodiments 1 and 2 allows forming many different designs of the scintillator, structural elements of different shapes and different heterogeneous structure, to deposit and align the scintillation structures on non-periodic or different-dimensional photodetector arrays, thus allowing simultaneous extension of the scope of its application.

The scintillation detector according to embodiments 1 and 2 made using the proposed methods, respectively, is a new type of scintillation detectors, the main feature of said detectors is the high contrast of the registered image due to structuring of the scintillator to be deposited on the surface of the pixelated photodetector using the method according to embodiments 1 or 2. The proposed detector according to embodiments 1 and 2 has an increased contrast of the registered image due to the absence of the effect of scattering between adjacent pixels of the photodetector, which is ensured by the physical isolation of adjacent sensitive areas in the scintillator layer so the light produced by the scintillation element will reach only the area of "its own" pixel and will not get into the adjacent one.

This group of inventions is not limited to the said embodiments, moreover, it covers various modifications and embodiments within the spirit and scope of the proposed claims.

The invention claimed is:

1. A method of forming a structured scintillator on a surface of a pixelated photodetector, the method comprising:
providing structural elements formed directly on a photosensitive area of the photodetector surface;
depositing a scintillation material of the structural elements by use of a two-axis or a three-axis means comprising at least one printing head separately forming a scintillator structure with respect to each pixel of the photodetector, wherein each pixel has a photosensitive area; and
utilizing the two axis or three axis means for discrete deposition of the scintillation material to individually form each scintillator structure in layers of differing spectrums of luminescence.

2. The method of claim 1, wherein the structural elements are heterogeneous in height and that heterogeneity is formed during the deposition.

3. The method of claim 1, wherein the scintillation material that forms each structural element is deposited with a single pass of the at least one printing head.

4. The method of claim 1, wherein the amount of scintillation material to be deposited is controlled to provide at least one of a spherical and pyramidal shape.

5. The method of claim 1, wherein the structural elements are formed in the sensitive area of a pixel in the pixelated photodetector.

6. The method of claim 5, wherein the scintillation material contains at least one phosphor composition.

7. The method of claim 5, wherein the structural elements are formed, during deposition, in a shape that is at least one of a group including hemispherical, parabolic, cylindrical shape, and a truncated pyramid, wherein a piece-wise continuous surface of the second or higher order or a combined shape of elements is formed.

8. The method of claim 5, wherein the structural elements are further formed with at least one material that absorbs detected radiation.

9. The method of claim 8, wherein the material which absorbs the detected radiation is deposited after forming the structural elements.

10. The method of claim 8, wherein the scintillation material is deposited after forming the structural elements which absorb the detected radiation.

11. The method of claim 8, wherein the scintillation material and the at least one material that absorbs the detected radiation are alternately deposited.

12. The method of claim 1, wherein the printing head has a nozzle with a shape matched with the structure of a photodetector pixel.

13. The method of claim 1, wherein each structural element is formed separately from other structural elements.

14. The method of claim 1, wherein at least part of the structural elements is formed separately from other structural elements.

15. The method of claim 1, wherein the surface of the scintillator is further coated with at least one layer of reflective coating.

16. The method of claim 1, wherein the structural elements are formed having locally differing optical and physical parameters across an entire photodetector plane to compensate for a non-linearity and non-uniformity of the sensitivity of the photodetector output signal.

17. A method of forming a structured scintillator on a surface of a pixelated photodetector, the method comprising:
forming structural elements on the surface; and
segmenting the surface with a hydrophobic coating matched to inter-pixel insensitive areas, forming geometric shapes of deposited material with surface tension forces at boundaries of hydrophobic or hydrophilic areas of the surface, wherein the structural elements are formed from scintillation material to have layers of differing spectrums of luminescence.

18. The method of claim 17, wherein hydrophilic material is deposited onto sensitive areas of the pixels in the pixelated photodetector.

19. The method of claim 17, wherein at least one phosphor composition is used as the scintillation material of the structural elements of the photodetector.

20. The method of claim 17, wherein the scintillation material of the structural elements is deposited by immersing the photodetector in a colloidal solution or suspension of phosphor material.

21. The method of claim 17, wherein the scintillation material of the structural elements is deposited by using a two-axis or three-axis means for discrete deposition of homogeneous liquid or heterogeneous substances comprising at least one printing head.

22. The method of claim 21, wherein the at least one printing head has a nozzle with a shape matching the structure of a photodetector pixel.

23. The method of claim 17, wherein the structural elements are further formed from at least one material that absorbs detected radiation.

24. The method of claim 17, wherein each structural element is formed separately from other structural elements.

25. The method of claim 17, wherein at least part of the structural elements is formed separately from other structural elements.

26. The method of claim 17, wherein the surface of the scintillator is further coated with at least one layer of reflective coating.

27. The method of claim 17, wherein the structural elements are formed having locally differing optical and physical parameters across an entire photodetector plane to compensate for non-linearity and non-uniformity of a sensitivity of the photodetector output signal.

* * * * *